US006734266B2

(12) United States Patent
Gao et al.

(10) Patent No.: US 6,734,266 B2
(45) Date of Patent: May 11, 2004

(54) CATALYST FOR OLEFIN POLYMERIZATION

(75) Inventors: Xiaoliang Gao, Calgary (CA); P. Scott Chisholm, Calgary (CA); Matthew Gerald Kowalchuk, Calgary (CA); Robert D. Donaldson, Calgary (CA)

(73) Assignee: Nova Chemicals (International) S.A. (CH)

( * ) Notice: Subject to any disclaimer, the term of this patent is extended or adjusted under 35 U.S.C. 154(b) by 270 days.

(21) Appl. No.: 10/074,662

(22) Filed: Feb. 13, 2002

(65) Prior Publication Data

US 2003/0087754 A1 May 8, 2003

(30) Foreign Application Priority Data

Feb. 23, 2001 (CA) .............................................. 2338094

(51) Int. Cl.[7] .............................. C08F 4/64; B01J 31/22; B01J 32/00

(52) U.S. Cl. ....................... 526/129; 526/161; 526/165; 502/120; 502/152; 502/154; 502/155

(58) Field of Search ................................. 526/129, 161, 526/165; 502/120, 152, 154, 155

(56) References Cited

U.S. PATENT DOCUMENTS

| | | | |
|---|---|---|---|
| 3,231,550 A | 1/1966 | Manyik et al. | 260/88.2 |
| 4,364,839 A | 12/1982 | McDaniel et al. | 252/430 |
| 4,404,344 A | 9/1983 | Sinn et al. | 526/160 |
| 4,444,966 A | 4/1984 | McDaniel | 526/106 |
| 4,543,399 A | 9/1985 | Jenkins, III et al. | 526/70 |
| 4,619,980 A | 10/1986 | McDaniel et al. | 526/96 |
| 4,808,561 A | 2/1989 | Welborn, Jr. | 502/104 |
| 5,352,749 A | 10/1994 | De Chellis et al. | 526/68 |
| 5,434,116 A | 7/1995 | Sone et al. | 502/103 |
| 5,554,775 A | 9/1996 | Krishnamurti et al. | 556/7 |
| 5,637,659 A | 6/1997 | Krishnamurti et al. | 526/133 |
| 6,107,230 A * | 8/2000 | McDaniel et al. | 502/104 |
| 6,235,918 B1 * | 5/2001 | Marks et al. | 556/53 |
| 6,300,271 B1 * | 10/2001 | McDaniel et al. | 502/104 |

* cited by examiner

*Primary Examiner*—Caixia Lu
(74) *Attorney, Agent, or Firm*—Kenneth H. Johnson

(57) ABSTRACT

A supported catalyst for olefin polymerization comprises a combination of a sulfated metal oxide support, an aluminoxane and an organometallic complex of a group 4 metal. The sulfated metal oxide may be quickly and conveniently prepared by, for example, contacting the precursor metal oxide with a sulfuric acid. The supported catalyst of this invention is highly active for olefin polymerization in comparison to conventional catalysts which are prepared with non-sulfated supports.

9 Claims, No Drawings

CATALYST FOR OLEFIN POLYMERIZATION

FIELD OF THE INVENTION

This invention relates to catalyst used for olefin polymerizations, especially ethylene polymerization.

BACKGROUND OF THE INVENTION

The use of an aluminoxane as a cocatalyst for ethylene polymerization catalyst was reported by Manyik et al in U.S. Pat. No. 3,231,550.

Subsequently, Kamisky and Sinn discovered that aluminoxanes are excellent cocatalysts for metallocene catalysts, as disclosed in U.S. Pat. No. 4,404,344.

The use of a supported aluminoxane/metallocene catalyst is further described in, for example, U.S. Pat. No. 4,808,561.

However, aluminoxanes are expensive materials so it is desirable to optimize the use thereof.

The use of phosphated and/or sulfated metal oxides has been proposed to improve the performance of chromium oxide polymerization catalysts. See, for example, U.S. Pat. Nos. 4,364,839; 4,444,966; and 4,619,980.

We have now discovered that the use of a sulfated metal oxide support substantially improves the activity of ethylene polymerization catalysts when used with an aluminoxane cocatalyst.

SUMMARY OF THE INVENTION

The present invention provides a catalyst system for olefin polymerization comprising:

a) a catalyst support component comprising aluminoxane which is deposited on a sulfated metal oxide; and
b) an organometallic complex of a group 4 metal.

In another embodiment, the present invention provides a process to prepare a catalyst system for olefin polymerization comprising:

a) preparing a sulfated metal oxide by contacting a metal oxide with sulfuric acid;
b) preparing a catalyst support component by depositing aluminoxane upon said sulfated metal oxide; and
c) depositing an organometallic complex of a group 4 metal upon said catalyst support component.

The present invention also provides a process to prepare polyolefins using the catalyst technology of this invention.

DETAILED DESCRIPTION

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides which are well known for use in olefin polymerization catalysts and are preferred for reasons of cost and convenience. Silica is particularly preferred.

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides which have comparatively high surface areas (greater than 1 m²/g, particularly greater than 100 m²/g, more particularly greater than 200 m²/g) are preferred to non-porous metal oxides.

The sulfated metal oxides used in this invention are prepared by directly treating the metal oxide with a material having an $SO_4$ group (such as sulfuric acid). Other exemplary (non-limiting) sulfating agents include simple salts of sulfate (such as sodium or calcium sulfate) and ammonium sulfate.

The sulfated metal oxide may be calcined using conventional calcining techniques (for example, heating the sulfated metal oxide at a temperature of from 20 to 800° C. for from 1 to 24 hours).

Aluminoxanes are readily available items of commerce which are known to be cocatalysts for olefin polymerization catalysts (especially group 4 metal metallocene catalysts). A generally accepted formula to represent aluminoxanes is:

$$(R)_2AlO(RAlO)_mAl(R)_2$$

wherein each R is independently an alkyl group having from 1 to 8 carbon atoms and m is between 0 and about 50. The preferred aluminoxane is methylaluminoxane wherein R is predominantly methyl. Commercially available methylaluminoxane ("MAO") and "modified MAO" are preferred for use in this invention. [Note: In "modified MAO", the R groups of the above formula are predominantly methyl but a small fraction of the R groups are higher hydrocarbyls—such as ethyl, butyl or octyl—so as to improve the solubility of the "modified MAO" in aliphatic solvents.]

The sulfated metal oxide and aluminoxane are contacted together so as to form the catalyst component of this invention. This is preferably done using conventional techniques such as mixing the aluminoxane and sulfated metal oxide together in an aliphatic or aromatic hydrocarbon (such as hexane or toluene) at a temperature of from 10 to 200° C. for a time of from 1 minute to several hours. The amount of aluminoxane is preferably sufficient to provide from 1 to 40 weight % aluminoxane (based on the combined weight of the aluminoxane and the sulfated metal oxide).

The resulting catalyst component is suitable for use in olefin polymerization reactions when combined with a polymerization catalyst. These catalysts contain a group 4 metal. It is especially preferred to provide an Al:M mole ratio of from 10:1 to 200:1, especially 50:1 to 150:1 in the finished catalyst complex (where Al is the aluminum provided by the aluminoxane and M is the group 4 metal). The catalyst component (i.e. the sulfated metal oxide/aluminoxane) may be combined with the polymerization catalyst using techniques which are conventionally used to prepare supported aluminoxane/metallocene catalysts. Such techniques are well known to those skilled in the art. In general, a hydrocarbon slurry of the catalyst component may be contacted with the catalyst complex. It is preferred to use a hydrocarbon in which the catalyst complex is soluble. The examples illustrate suitable techniques to prepare the "catalyst systems" of this invention. Particularly preferred catalysts are organometallic complexes of a group 4 metal, as defined by the formula:

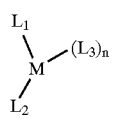

wherein M is selected from titanium, hafnium and zirconium; $L_1$ and $L_2$ are independently selected from the group consisting of cyclopentadienyl, substituted cyclopentadienyl (including indenyl and fluorenyl) and heteroatom ligands, with the proviso that $L_1$ and $L_2$ may optionally be bridged together so as to form a bidentate ligand. It is further preferred that n=2 (i.e. that there are 2 monoanionic activatable ligands).

As previously noted, each of $L_1$ and $L_2$ may independently be a cyclopentadienyl ligand or a heteroatom ligand. Preferred catalysts include metallocenes (where both $L_1$ and $L_2$ are cyclopentadienyl ligands which may be substituted and/or bridged) and monocyclopentadienyl-heteroatom catalysts (especially a catalyst having a cyclopentadienyl ligand and a phosphinimine ligand), as illustrated in the Examples.

Brief descriptions of exemplary ligands are provided below.

Cyclopentadienyl Ligands $L_1$ and $L_2$ may each independently be a cyclopentadienyl ligand. As used herein, the term cyclopentadienyl ligand is meant to convey its broad meaning, namely a substituted or unsubstituted ligand having a five carbon ring which is bonded to the metal via eta-5 bonding. Thus, the term cyclopentadienyl includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of 1) $C_{1-10}$ hydrocarbyl radical (which hydrocarbyl radicals are unsubstituted or further substituted); 2) a halogen atom; 3) $C_{1-8}$ alkoxy radical; 4) a $C_{6-10}$ aryl or aryloxy radical; 5) an amido radical which is unsubstituted or substituted by up to two $C_{1-8}$ alkyl radicals; 6) a phosphido radical which is unsubstituted or substituted by up to two $C_{1-8}$ alkyl radicals; 7) silyl radicals of the formula —Si—$(R^1)_3$ wherein each $R^1$ is independently selected from the group consisting of hydrogen, a $C_{1-8}$ alkyl or alkoxy radical $C_{6-10}$ aryl or aryloxy radicals; and 8) germanyl radicals of the formula Ge—$(R^1)_3$ wherein $R^1$ is as defined directly above.

Activatable Ligands $L_3$ is an activatable ligand. The term "activatable ligand" refers to a ligand which may be activated by a cocatalyst or "activator" (e.g. the aluminoxane) to facilitate olefin polymerization. Exemplary activatable ligands include selected from the group consisting of 1) a hydrogen atom; 2) a halogen atom; 3) a $C_{1-10}$ hydrocarbyl; 4) a $C_{1-10}$ alkoxy; 5) a $C_{5-10}$ aryl oxide; 6) an amido; and 7) a phosphido.

The number of activatable ligands depends upon the valency of the metal and the valency of the activatable ligand. As previously noted, the preferred catalysts contain a group 4 metal in the highest oxidation state (i.e. 4+) and the preferred activatable ligands are monoanionic (such as a halide—especially chloride, or an alkyl—especially methyl). Thus, the preferred catalyst contains two activatable ligands. In some instances, the metal of the catalyst component may not be in the highest oxidation state. For example, a titanium (III) component would contain only one activatable ligand. Also, it is permitted to use a dianionic activatable ligand although this is not preferred.

Heteroatom Ligands

As used herein, the term heteroatom ligand refers to a ligand which contains a heteroatom selected from the group consisting of nitrogen, boron, oxygen, phosphorus and sulfur. The ligand may be sigma or pi bonded to the metal. Exemplary heteroatom ligands include phosphinimine ligands, ketimide ligands, siloxy ligands, amido ligands, alkoxy ligands, boron heterocyclic ligands and phosphole ligands. Brief descriptions of such ligands follow:

Phosphinimine Ligands

Phosphinimine ligands are defined by the formula:

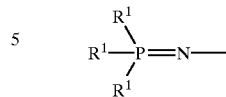

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

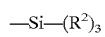

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

Ketimide Ligands

As used herein, the term "ketimide ligand" refers to a ligand which:

(a) is bonded to the group 4 metal via a metal-nitrogen atom bond;

(b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b, and c are illustrated below:

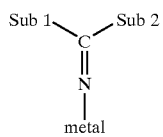

The substituents "Sub 1" and "Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

Siloxy Heteroligands

These ligands are defined by the formula:

where the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-4}$ hydrocarbyl group such as methyl, ethyl, isopropyl or tertiary butyl (simply because such materials are readily synthesized from commercially available materials).

Amido Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom. The amido ligand may be bridged (for example, to a cyclopentadienyl group so as to form a bidentate ligand.

Alkoxy Ligands

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and/or substituted (e.g. 2, 6 di-tertiary butyl phenoxy).

Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554, 775 and the references cited therein).

Phosphole Ligands

The term "phosphole" is also meant to convey its conventional meaning. "Phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals.

Phosphole ligands are also well known to those skilled in the art of olefin polymerization and are described as such in U.S. Pat. No. 5,434,116 (Sone, to Tosoh).

Polymerization Processes

This invention is suitable for use in any conventional olefin polymerization process, such as the so-called "gas phase", "slurry", "high pressure" or "solution" polymerization processes. Polyethylene, polypropylene and ethylene propylene elastomers are examples of olefin polymers which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc, the so-called very low and ultra low density polyethylenes.

The catalyst of this invention is preferably used in a slurry polymerization process or a gas phase polymerization process.

A typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant—and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid preferably does not exceed about 20 weight percent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

Further details are provided by the following non-limiting examples.

EXAMPLES

The following abbreviations are used in the Examples:

| 1. | TIBAL = | triisobutyl aluminum |
|---|---|---|
| 2. | wt % = | weight percent |
| 3. | g = | grams |
| 4. | mmol = | millimole |
| 5. | ~ = | approximately |
| 6. | rpm = | revolutions per minute |
| 7. | psig = | pounds per square inch (gauge) |
| 8. | [$C_2$] = | concentration of ethylene (moles per litre) |
| 9. | (t-$Bu_3$PN) = | tri-tertiary butyl (phosphinimine) |
| 10. | Ind = | indenyl |
| 11. | Cp = | cyclopentadienyl |
| 12. | ml = | millilitre |
| 13. | nBu = | normal butyl |

Part A Preparation of Sulfated Supports

Example S1

To an aqueous solution of $(NH_4)_2SO_4$ (100 mmol) at room temperature was added silica (50 g sold under the tradename XPO-2408 from W. R. Grace). The water was then removed by vacuum pumping. The solid was dried in a 135° C. oven overnight to remove most of the water. The free flowing material was calcined at 200° C. for 2 hours under air and then at 600° C. for 6 hours under nitrogen. The modified silica obtained was used as carrier for catalyst preparation.

Example S2

The procedure was the same as in S1, but 3 mmol of $(NH_4)_2SO4$ per gram of silica gel was used.

Example S3

Same as S1 except the dehydration temperature was at 200° C. for two hours under air and at 330° C. for 6 hours under nitrogen.

Example S4

$H_2SO_4$ (95–98%, 14.72 g, 150 mmol) was added drop-wise to a slurry of silica (XPO-2408; 50 g) agitated gently by hand in deionized distilled water (~250 ml) at room temperature. The solvent was removed using a rotary evaporator until the product was a loose solid. The solid was transferred to a beaker and dried in a 135° C. oven over a weekend to remove most of the water. The free flowing material was then heated at 200° C. under air for 2 hours and calcined at 600° C. under nitrogen for 6 hours. The calcined silica (observed to be slightly discolored) was stored in a glove box for further use.

Example S5

$H_2SO_4$ (95–98%, 4.9 g, 50 mmol) was dissolved in ethanol (300 ml). Silica gel (50 g) was slurried into the solution. The solvent was pumped to dryness and the remaining material was calcined at 200° C. under air for two hours and at 600° C. under nitrogen for 6 hours.

Example S6

$H_2SO_4$ (95–98%, 0.490 g, 5 mmol) was added drop-wise to a slurry of previously calcined silica (XPO-2408; 10 g) slurried in anhydrous heptane (~150 ml) by overhead mechanical stirrer at ~300 rpm. The reaction mixture was stirred overnight. The solid was collected by filtration, washed thoroughly with heptane and dried under vacuum. The sulfated silica was sieved and stored in a glove box for further use.

Example S7

$H_2SO_4$ (95–98%, 29.44 g, 300 mmol) and silica (100 g) were used with the same procedure as in Example S4. After dehydration, 104 g product was obtained.

Example S8—Comparative $H_3PO_4$ (85 wt % in water, 3.4 ml, 50 mmol) diluted in deionized distilled water (~100 ml) was added dropwise to a slurry of silica agitated vigorously by mechanical overhead stirrer at room temperature. The reaction mixture was stirred at room temperature over a weekend. The solvent was removed using a rotary evaporator until the product was a loose solid. The modified silica was transferred to a beaker and dried in a 135° C. oven overnight to remove most of the water. The free flowing silica was then heated at 200° C. under air for 2 hours and then calcined at 600° C. under nitrogen for 6 hours. The product was gray in color, and some chunks were present. The calcined silica was stored in a glove box for further use.

Example S9

$H_2SO_4$ (95–98%, 5.89 g, 60 mmol) was added drop-wise to a slurry of aluminum oxide (activated, basic, Brockmann I, purchased from Sigma-Aldrich, 20 g) in deionized distilled water (~125 ml) agitated by mechanical overhead stirrer (~200 rpm) at room temperature. A slight warming of the reaction vessel was detected during the course of addition, and the solid became a peach color. After complete addition, the mixture was stirred an additional 15 minutes at room temperature. The solvent was removed using a rotary evaporator until the product was a loose solid. The particle size of the solid was reduced in a mortar and pestle to produce a free flowing material. The modified aluminum oxide was then transferred to a beaker, and was dried in a 200° C. oven over a weekend to remove most of the water. The free flowing sulfated aluminum oxide was heated at 200° C. under air for 2 hours and then calcined at 600° C. under nitrogen for 6 hours. The calcined aluminum oxide was sieved to remove large solids and stored in a glove box for further use (18.5 g).

Part B Preparation of Supported Catalysts
Part 1 Preparation of Catalyst Component General procedure: Toluene was deoxygenated and dried (through columns of alumina, deoxo catalyst and activated molecular sieves under nitrogen) prior to use. Unless otherwise specified, the toluene and other solvents (e.g. heptane) are dried and deoxygenated this way. The support material (silica "XPO-2408" or modified support) was weighted into a 100 ml flask and toluene was added to make a slurry. A solution of methyaluminoxane (a commercially available material, sold under the tradename "PMAO-IP" by Akzo Nobel or "AB-MAO" by Albemarle) was added to the slurry while the slurry was stirred with a mechanical stirrer or with a minimum stirring speed with a magnetic stirrer.

Part 2 Preparation of Supported Catalyst Systems

The catalyst component slurry from Part 1 was stirred for 16 hours, which was filtered to remove the supernatant, and the solid was re-slurried into toluene. A solution of a catalyst complex (sufficient to provide an Al:Ti or Al:Zr molar ratio of approximately 120:1) was added slowly to the slurry. The combined mixture was stirred for 2 hours at room temperature and an additional 2 hours at 45° C. The catalyst system solids were recovered by filtration and washed with small amounts of toluene for 3 times. The catalyst was dried under vacuum and sieved.

Part C Bench Scale Polymerization Operating Conditions
Polymerization of Ethylene General procedures: All polymerization work was conducted by using a 2 liter, stirred, autoclave reactor running in a gas phase mode of operation. Polymerizations were conducted at 80 to 90° C. under a total reaction pressure of 200 pounds per square inch gauge ("psig"). A seed bed of dry NaCl (160 g) was used. A specified amount of 25% solution of tri-isobutyl aluminum (TIBAL) was used as a poison scavenger. Some copolymerizations were studied by injecting hexene into the reactor.

After the addition of scavenger (and optionally, co-monomer), ethylene was used to push the catalyst system into the reactor and to bring the reactor pressure to the total pressure of 200 psig. Typical polymerization conditions are summarized in Table 1.

TABLE 1

Typical Bench Scale Operating Conditions

| Solvent | 5 ml hexane added with catalyst |
|---|---|
| Operating Mode | Gas phase |
| Seed Bed | 160 g NaCl |
| Catalyst Charge | Ranges between 9–35 mg |
| Alkyl Scavenger | 25 weight % TIBAL in hexane (Akzo-Nobel) |
| Al (from alkyl scavenger):M | 250:1 |
| Ethylene | 0.4351–0.5174 molar |
| Hydrogen | 0–0.4 molar |
| Comonomer | 0–0.019 molar hexene |
| Reaction Pressure | 200 psig |
| Reaction Temperature | 90° C. |
| Reaction Time | 60 minutes |

Note:
m = transition metal in organometallic catalyst (i.e. Ti or Zr)

Specific conditions of the polymerization runs are collected in Table 2.

POLYMERIZATION EXAMPLES

Examples 1–3

Sulfated supports S1, S2 and S3 (made by calcining $SiO_2/(NH_4)_2SO_4$) were used to support $(t-Bu_3PN)(Ind)TiCl_2$. Substantial activity enhancement of catalyst activity was observed in comparison to the activity of the same phosphinimine catalyst on a standard (untreated) support. The results are in Table 2.

Examples 4–12

Supports S4 and S5 made by calcining $SiO_2/H_2SO_4$ were used for supporting $(t-Bu_3PN)(Ind)TiCl_2$. Significant catalyst activity enhancement was observed.

Examples 13–14

A support made by treatment of calcined silica with $H_2SO_4$ in non-aqueous environment was used for supporting $(t-Bu_3PN)(Ind)TiCl_2$.

Examples 15–17

Sulfated silica S7 obtained by calcining sulfuric acid and silica was used with $(n-BuCp)_2ZrCl_2$ and AB-MAO. Substantial activity enhancement was again observed in comparison to the activity of the same zirconocene catalyst on standard (untreated) silica. The experiment with the zirconocene and the comparative, untreated silica support, is shown as C2 in Table 2.

Comparative Examples C3 and C4

Phosphated silica supports obtained by treatment of silica with phosphoric acid followed by dehydration were used with $(t-Bu_3PN)(Ind)TiCl_2$ and PMAO. Activity enhancement was also observed but not as good as sulfated silica supports.

Example 18

Sulfated alumina was used with $(t-BU_3PN)(Ind)TiCl_2$ and PMAO. An activity of 49,127 gPE/mmol Ti[$C_2$] hr was observed.

TABLE 2

Polymerization of Ethylene with Sulfated Supports

| Exp # | Support and Code | Catalyst Loading (mmol/g sup) | Weight of Catalyst (mg) | Hexene (ml) | $H_2$ (psi) | Weight of PE (g) | Activity (gPE/mmolM) | Organometallic Catalyst/Co-Catalyst Al:M = 120:1 |
|---|---|---|---|---|---|---|---|---|
| C1 | $SiO_2$ (untreated) | 0.037 | 25 | 0 | 0 | 19.8 | 42,445 | $(t-Bu_3PN)(Ind)TiCl_2$/PMAO |
| 1 | $SiO_2/(NH_4)_2SO_4$ S1 | 0.037 | 11 | 0 | 0 | 14 | 68,209 | $(t-Bu_3PN)(Ind)TiCl_2$/PMAO |
| 2 | $SiO_2/(NH_4)_2SO_4$ S2 | 0.037 | 11 | 0 | 0 | 14.7 | 71,619 | $(t-Bu_3PN)(Ind)TiCl_2$/PMAO |
| 3 | $SiO_2/(NH_4)_2SO_4$ S3 | 0.037 | 11 | 0 | 0 | 10.4 | 50,669 | $(t-Bu_3PN)(Ind)TiCl_2$/PMAO |

TABLE 2-continued

Polymerization of Ethylene with Sulfated Supports

| Exp # | Support and Code | Catalyst Loading (mmol/g sup) | Weight of Catalyst (mg) | Hexene (ml) | $H_2$ (psi) | Weight of PE (g) | Activity (gPE/mmolM) | Organometallic Catalyst/Co-Catalyst Al:M = 120:1 |
|---|---|---|---|---|---|---|---|---|
| 4 | $SiO_2/H_2SO_4$ S4 | 0.037 | 10 | 0 | 0 | 33 | 176,857 | $(t-Bu_3PN)(Ind)TiCl_2$/PMAO |
| 5 | $SiO_2/H_2SO_4$ S4 | 0.019 | 16 | 0 | 0 | 32 | 208,731 | $(t-Bu_3PN)(Ind)TiCl_2$/PMAO |
| 6 | $SiO_2/H_2SO_4$ S4 | 0.019 | 16 | 0 | 0 | 22 | 143,502 | $(t-Bu_3PN)(Ind)TiCl_2$/PMAO |
| 7 | $SiO_2/H_2SO_4$ S4 | 0.019 | 14 | 0 | 0 | 19 | 141,639 | $(t-Bu_3PN)(Ind)TiCl_2$/PMAO |
| 8 | $SiO_2/H_2SO_4$ S4 | 0.037 | 10 | 0 | 0 | 27 | 144,701 | $(t-Bu_3PN)(Ind)TiCl_2$/PMAO |
| 9 | $SiO_2/H_2SO_4$ S4 | 0.019 | 15 | 0 | 0 | 21 | 146,111 | $(t-Bu_3PN)(Ind)TiCl_2$/PMAO |
| 10 | $SiO_2/H_2SO_4$ S4 | 0.019 | 14 | 0 | 0 | 11.6 | 86,474 | $(t-Bu_3PN)(Ind)TiCl_2$/PMAO |
| 11 | $SiO_2/H_2SO_4$ S5 | 0.037 | 11 | 0 | 0 | 33 | 160,779 | $(t-Bu_3PN)(Ind)TiCl_2$/PMAO |
| 12 | $SiO_2/H_2SO_4$ S5 | 0.037 | 12 | 5 | 0 | 57 | 276,498 | $(t-Bu_3PN)(Ind)TiCl_2$/PMAO |
| 13 | $SiO_2/H_2SO_4$ S6 | 0.037 | 25 | 0 | 0 | 36 | 77,174 | $(t-Bu_3PN)(Ind)TiCl_2$/PMAO |
| 14 | $SiO_2/H_2SO_4$ S6 | 0.037 | 9 | 0 | 0 | 11.6 | 69,075 | $(t-Bu_3PN)(Ind)TiCl_2$/PMAO |
| C2 | $SiO_2$ (untreated) | 0.1 | 30 | 0 | 0 | 42.5 | 28,000 | $(n-BuCp)_2ZrCl_2$/ABMAO |
| 15 | $SiO_2/H_2SO_4$ S7 | 0.05 | 22 | 0 | 0 | 67.6 | 121,861 | $(n-BuCp)_2ZrCl_2$/ABMAO |
| 16 | $SiO_2/H_2SO_4$ S7 | 0.05 | 10 | 0 | 0 | 28.8 | 114,217 | $(n-BuCp)_2ZrCl_2$/ABMAO |
| 17 | $SiO_2/H_2SO_4$ S7 | 0.05 | 9 | 0 | 0 | 28.2 | 124,264 | $(n-BuCp)_2ZrCl_2$/ABMAO |
| C3 | $SiO_2/H_3PO_4$ S8 | 0.037 | 10 | 0 | 0 | 11.9 | 63,775 | $(t-Bu_3PN)(Ind)TiCl_2$/PMAO |
| C4 | $SiO_2/H_3PO_4$ S8 | 0.037 | 21 | 0 | 0 | 27 | 68,905 | $(t-Bu_3PN)(Ind)TiCl_2$/PMAO |
| 8 | $Al_2O_3/H_2SO_4$ S9 | 0.037 | 12 | 0 | 0 | 11 | 49,127 | $(t-Bu_3PN)(Ind)TiCl_2$/PMAO |

Note:
C1 = comparative (made with standard, untreated silica)

What is claimed is:

1. A catalyst system for olefin polymerization comprising:
   a) a catalyst support component comprising aluminoxane which is deposited on a sulfated metal oxide; and
   b) an organometallic complex of a group 4 metal.

2. The catalyst component according to claim 1 wherein said aluminoxane is methylaluminoxane.

3. The catalyst component according to claim 1 wherein said metal oxide is selected from silica and alumina.

4. The catalyst component according to claim 1 wherein said aluminoxane is present in an amount of from 1 to 40 weight % based on the combined weight of said sulfated metal oxide and said aluminoxane.

5. The catalyst system according to claim 1 wherein said organometallic complex of a group 4 metal is defined by the formula:

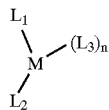

wherein M is selected from titanium, hafnium and zirconium; $L_1$ and $L_2$ are independently selected from the group consisting of cyclopentadienyl, substituted cyclopentadienyl and heteroatom ligands, with the proviso that $L_1$ and $L_2$ may optionally be bridged together so as to form a bidentate ligand; n is 1 or 2; and $L_3$ is an activatable ligand.

6. The catalyst system according to claim 5 wherein $L_1$ is selected from cyclopentadienyl and substituted cyclopentadienyl; $L_2$ is a phosphinimine ligand; n is 2; and each $L_3$ is a halide or methyl.

7. The catalyst system according to claim 5 further characterized in that said metal oxide is silica and said aluminoxane is methylaluminoxane.

8. A process for olefin polymerization comprising contacting at least one olefin monomer with the catalyst system according to claim 1 under polymerization conditions.

9. A process to prepare a catalyst system for olefin polymerization comprising:
   a) preparing a sulfated metal oxide by contacting a metal oxide with sulfuric acid;
   b) preparing a catalyst support component by depositing aluminoxane upon said sulfated metal oxide; and
   c) depositing an organometallic complex of a group 4 metal upon said catalyst support component.

* * * * *